(12) United States Patent
Wei et al.

(10) Patent No.: US 11,299,411 B2
(45) Date of Patent: Apr. 12, 2022

(54) BIO-ENHANCED DEODORIZATION EQUIPMENT

(71) Applicant: Shenzhen Green Fields Environmental Technology Co., Ltd., Guangdong (CN)

(72) Inventors: Dan Wei, Jilin (CN); Zijun Tian, Jilin (CN); Huan Lu, Jilin (CN); Zhonghua Zhang, Jilin (CN); Tingting Zhao, Jilin (CN)

(73) Assignee: Shenzhen Green Fields Environmental Technology Co., Ltd., Shenzhen (CN)

( * ) Notice: Subject to any disclaimer, the term of this patent is extended or adjusted under 35 U.S.C. 154(b) by 72 days.

(21) Appl. No.: 17/038,831

(22) Filed: Sep. 30, 2020

(65) Prior Publication Data

US 2021/0395121 A1    Dec. 23, 2021

(30) Foreign Application Priority Data

Jun. 18, 2020    (CN) .......................... 202021143380.1

(51) Int. Cl.
*C02F 3/10* (2006.01)
*C02F 3/20* (2006.01)

(52) U.S. Cl.
CPC .................. *C02F 3/10* (2013.01); *C02F 3/20* (2013.01); *C02F 2303/02* (2013.01)

(58) Field of Classification Search
CPC ........ B01D 2257/708; B01D 2257/304; C02F 3/06; C02F 3/101; C02F 2303/02; C02F 3/20; C02F 2101/101

USPC .......................... 210/150, 615, 617, 620, 916
See application file for complete search history.

(56) References Cited

U.S. PATENT DOCUMENTS

2014/0238933 A1*  8/2014  Gencer .................. C02F 3/101
                                                      210/615
2020/0339455 A1* 10/2020  Shamskhorzani ..........................
                                                      B01F 23/232311

FOREIGN PATENT DOCUMENTS

| CN | 101684021 A | | 3/2010 |
| CN | 103979687 A | * | 8/2014 |
| CN | 104310577 A | | 1/2015 |
| CN | 106554130 A | | 4/2017 |
| CN | 209428339 U | | 9/2019 |

OTHER PUBLICATIONS

Huang et al, CN 103979687, English machine translation, pp. 1-4 (Year: 2014).*

* cited by examiner

*Primary Examiner* — Claire A Norris

(57) ABSTRACT

A bio-enhanced deodorization equipment includes a main body and a filler container in the main body. The filler container includes a wall and at least three perforated separator plates vertically arranged in the filler container. A plurality of spaces are formed by the at least three perforated separator plates, and a microbial filler and a carrier filler are accommodated in the spaces in an alternate manner.

3 Claims, 2 Drawing Sheets

BIO-ENHANCED DEODORIZATION EQUIPMENT

CROSS-REFERENCE TO RELATED APPLICATIONS

This application claims the benefit of priority from Chinese Patent Application No. 202021143380.1, filed on Jun. 18, 2020. The content of the aforementioned applications, including any intervening amendments thereto, is incorporated herein by reference in its entirety.

TECHNICAL FIELD

The present application relates to wastewater treatment, more particularly to a bio-enhanced deodorization equipment.

BACKGROUND

Wastewater treatment generates a plenty of foul-smelling gases, mainly including sulfur-containing compounds, nitrogen-containing compounds, hydrocarbons and oxygen-containing compounds, such as hydrogen sulfide, mercaptans, ammonia, aromatic hydrocarbons and organic acids. These foul-smelling gases cause serious atmospheric pollution, threaten health of employees in the wastewater treatment plants and affect the life quality of surrounding residents. Meanwhile, these foul-smelling gases contain corrosive gases, such as hydrogen sulfide, which can cause severe corrosion damage to equipment in the plant to shorten the service life of the equipment. Discharge Standard of Pollutants for Municipal Wastewater Treatment Plant (GB18918-2002) has made clear requirements for the discharge of pollutants from wastewater treatment plants. It is significant to realize the deodorization in wastewater treatment processes for environmental protection, guaranteeing the health of residents and prolonging the service life of the equipment in the plants.

The odors from wastewater treatment plants are mainly derived from a pretreatment area, a water treatment area and a sludge treatment area, which includes coarse bar screens, an inlet pump chamber, fine bar screens, a grit chamber, a primary sedimentation tank, a biological reaction tank, a sludge thickening tank, a sludge holding tank and a sludge dewatering chamber. Commonly used equipment or techniques associated with the wastewater treatment generally collect the generated odors and then process them. These equipment and techniques mainly include bio-trickling filtration, soil infiltration, biological activated carbon adsorption column, ion deodorization, chemical oxidation and spray of masking agents, having disadvantages of a complicated collecting system, large occupied area, intricate operation management, high cost in the construction and the operation as well as certain operational safety risks. In some equipment or techniques that are not widely applied, the release of the odors can be completely or basically blocked. However, these equipment or techniques have drawbacks of low deodorization efficiency, complicated operation and maintenance, short duration of the deodorizing effect and limited functions.

SUMMARY

In order to overcome the shortcomings in the prior arts, the present application provides a bio-enhanced deodorization equipment, which can remove or inhibit, from the source, odor-causing gases such as hydrogen sulfide, ammonia and organic acids, and weaken the unpleasant smell of subsequent sludge. In the present application, the sludge reduction and the sludge dewatering performance are enhanced, meanwhile, the efficiency of nitrogen and phosphorous removal is increased.

The technical solutions of the present application are described as follows.

The present application provides a bio-enhanced deodorization equipment, which comprises a main body, a filler container, a first cover, an aeration pipe, an air supply pipe and a second cover;

wherein a plurality of supports spaced apart are provided at a bottom of the main body; the first cover is arranged at the bottom of the main body and provided with a plurality of first openings spaced apart; the second cover is arranged on a top of the main body and provided with a plurality of second openings spaced apart; and the main body and the second cover are fixedly connected via a plurality of flanges spaced apart;

the aeration pipe is arranged in the main body and above the first cover; and the air supply pipe is arranged out of the main body and communicated with the aeration pipe; and the filler container comprises a wall and at least three perforated separator plates vertically arranged in the filler container; a plurality of spaces are formed by the at least three perforated separator plates; and a microbial filler and a carrier filler are accommodated in the spaces in an alternate manner.

In some embodiments, the first cover is welded to the main body.

In some embodiments, the aeration pipe consists of two aeration pipes in two loops.

The present application has the following beneficial effects.

1) The bio-enhanced deodorization equipment has an excellent deodorization performance, specifically it can remove or inhibit, from the source, odor-causing gases such as hydrogen sulfide, ammonia and organic acids, and weaken the unpleasant smell of subsequent sludge. In the present application, the sludge reduction and sludge dewatering performance are enhanced, meanwhile, the efficiency of nitrogen and phosphorous removal is increased.

2) Instead of adding an odor-collecting system and a delivery system for the wastewater treatment, the bio-enhanced deodorization equipment of the present application can be easily placed in an anoxic zone or an aerobic zone of a biochemical reaction tank, or in a sludge enhancement tank of a sludge return system. Thus, the bio-enhanced deodorization equipment has a small occupied area, and is convenient and easy to use.

3) The bio-enhanced deodorization equipment can be used in the traditional activated sludge process, an aerobic-anoxic-oxic (A/A/O) process, anoxic/oxic (A/O) process, sequencing batch reactor (SBR) activated sludge process, moving bed biofilm reactor (MBBR) and oxidation ditch, and it can also be used in membrane biological reactor (MBR), which benefits the reduction of membrane fouling, thereby prolonging the membrane cleaning cycle and stabilizing the membrane flux.

Figure 1:
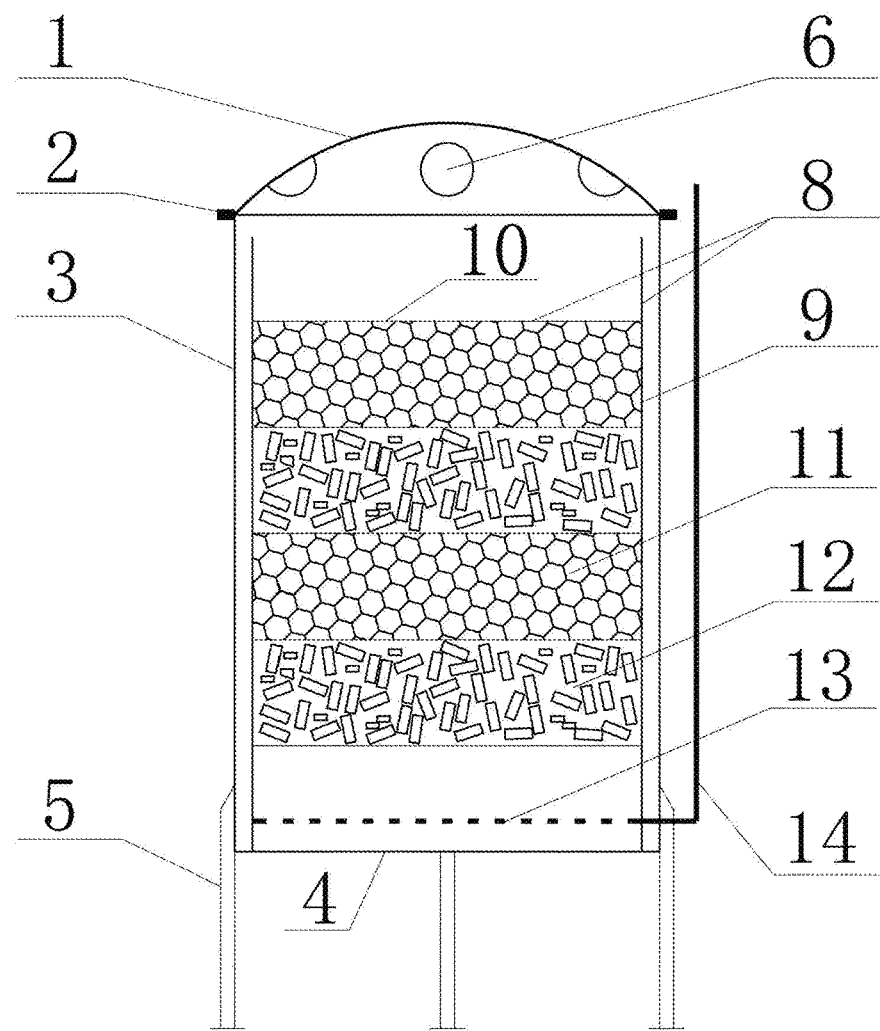
FIG. 1 is a cross-sectional view of a bio-enhanced deodorization equipment according to the present application.

In the drawings: 1, second cover; 2, flanges; 3, main body; 4, first cover; 5, supports; 6, second opening; 7, first opening; 8, filler container; 9, wall; 10, perforated separator plate; 11, microbial filler; 12, carrier filler; 13, aeration pipe; and 14, air supply pipe.

DETAILED DESCRIPTION OF EMBODIMENTS

The preferred embodiments of the present application will be described below with reference to the accompanying drawings. It should be understood that the embodiments disclosed herein are merely illustrative and not intended to limit the scope of the present application.

Figure 2:
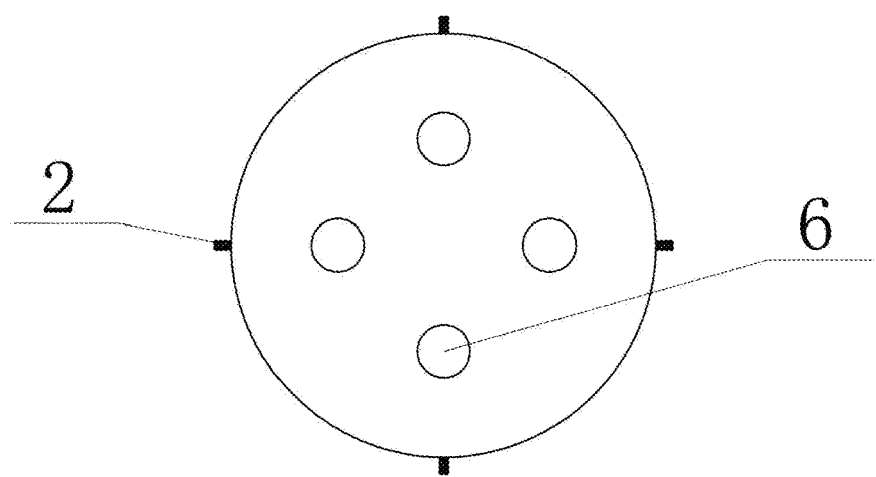
FIG. 2 schematically shows a second cover of the bio-enhanced deodorization equipment according to the present application.
Figure 3:
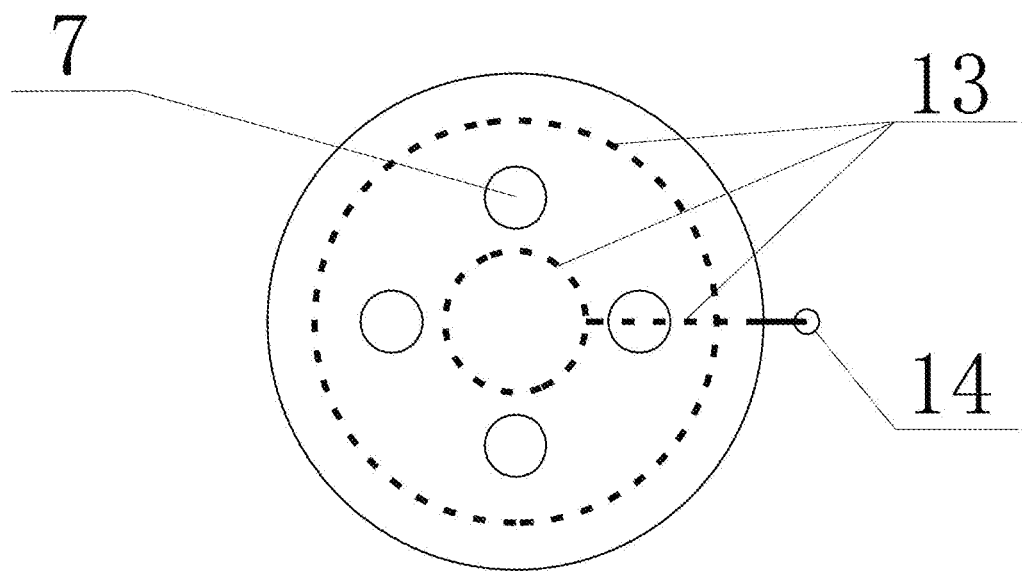
FIG. 3 illustrates a first cover and aeration pipes of the bio-enhanced deodorization equipment according to the present application.
Figure 4:
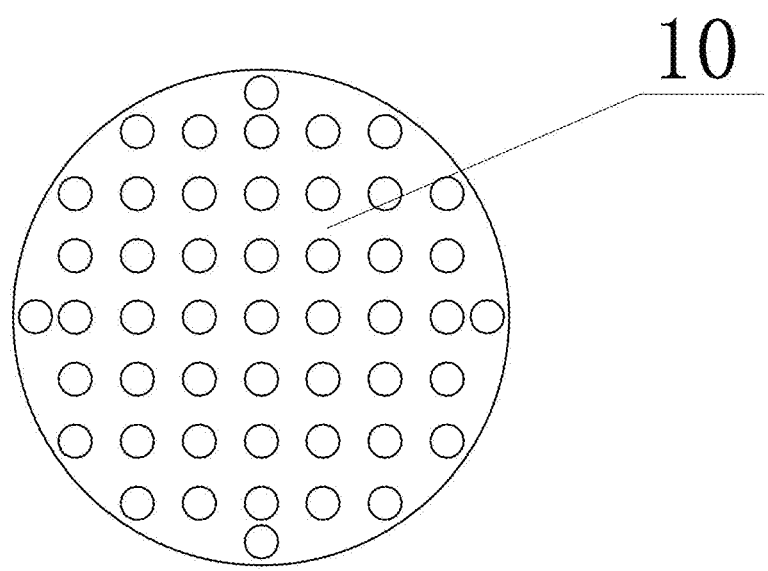
FIG. 4 is a schematic diagram showing a perforated separator plate according to the present application.

A bio-enhanced deodorization equipment, as shown in FIGS. 1-4, includes a main body 3, a second cover 1, a first cover 4, four flanges 2, three supports 5, which are made of hop-dip galvanized steel.

The main body 3 is cylindrical with a height of 1800 mm, a diameter of 1200 mm and a thickness of 6 mm. The first cover 4 is arranged at a bottom of the main body 3 and welded to the bottom of the main body 3. The first cover 4 has a thickness of 6 mm and a diameter of 1200 mm. Four first openings 7 spaced apart are provided on the first cover 4, and each of the four first openings 7 has a diameter of 200 mm. The second cover 1 is arranged on a top of the main body 3, and has a height of 260 mm, a diameter of 1200 mm and a thickness of 6 mm. Four second openings 6 spaced apart are provided on the second cover 1, and each of the four second openings 6 has a diameter of 200 mm. The main body 3 and the second cover 1 are fixedly connected via the four flanges 2 spaced apart. Each of the flanges 2 is fixed via a plurality of bolts made of hot-dip galvanized carbon steel.

The three supports 5 spaced apart are externally provided at the bottom of the main body 3. Each of the three supports 5 has a height of 500 mm. An aeration pipe 13 is arranged in the main body 3 and above the first cover 4. The aeration pipe 13 has nominal diameter of 25 mm and is made of 304 stainless steel. An air supply pipe 14 is arranged out of the main body 3 and communicated with the aeration pipe 13. The air supply pipe 14 has a nominal diameter of 25 mm and is made of 304 stainless steel.

The aeration pipe 13 consists of two aeration pipes in two loops having diameters of 400 mm and 1000 mm, respectively.

The bio-enhanced deodorization equipment further includes a filler container 8 arranged in the main body 3. The filler container 8 is cylindrical and has a diameter of 1000 mm and a height of 300 mm. The filler container 8 includes a wall 9 and five perforated separator plates 10 vertically arranged in the filler container 8. The wall 9 has a thickness of 6 mm and may be made of 304 stainless steel.

A distance between two adjacent perforated separator plates 10 is 60 mm. A plurality of holes are spaced apart on each of the perforated separator plates 10 and each hole has a diameter of 10 mm. A plurality of spaces are formed by the perforated separator plates 10. A microbial filler 11 and a carrier filler 12 are accommodated in the spaces in an alternate manner.

The microbial filler 11 includes 50% by weight of powdered coal activated carbon, 10% by weight of forest surface soil, 4% by weight of silicate, 5% by weight of quicklime, 25% by weight of clay, 5% by weight of adhesive agent, 0.3% by weight of *Bacillus subtilis*, 0.2% by weight of *Pseudomonas putida*, 0.1% by weight of *Agrobacterium*, 0.2% by weight of *Thiobacillus* and 0.2% by weight of nitrifying bacteria. The microbial filler 11 has a shape similar to a cylinder, and has a height of 40-80 mm and a cross-sectional diameter of 10-35 mm.

The carrier filler 12 includes, preferably, 35% by weight of fly ash, 10% by weight of excess activated sludge, 10% by weight of sawdust, 10% by weight of humic acid organic fertilizer, 20% by weight of clay, 5% by weight of a compound containing iron and magnesium, 5% by weight of cellulose, 3% by weight of sodium silicate and 2% by weight of calcium chloride.

In an embodiment, the carrier filler 12 includes, preferably, 40% by weight of volcanic rock, 5% by weight of tourmaline, 5% by weight of zeolite, 7% by weight of humic acid, 5% by weight of urea, 5% by weight of compound fertilizer, 25% by weight of clay, and 8% by weight of adhesive agent. The carrier filler 12 has a shape similar to a cylinder and has a height of 40-80 mm and a cross-sectional diameter of 10-35 mm.

In the wastewater treatment, a plurality of bio-enhanced deodorization equipment are placed at a bottom of an anoxic zone or an aerobic zone of a biochemical reaction tank, or in a sludge enhancement tank of a sludge return system, and then the air supply pipe 14 is communicated with the aeration pipe, thereby realizing bio-enhanced deodorization. In the sludge return system, activated sludge are returned for inoculation. The activated sludge needs a lot of microorganisms and organic matter, so that it takes a long time to cultivate the activated sludge. If there is no sludge return system, a processing capacity of new sludge is limited. The sludge return system can also accelerate a reproduction of microorganisms.

Specifically, in use, a bio-enhanced deodorization equipment is placed in the anoxic zone or the aerobic zone, preferably in the anoxic zone. Optionally, the bio-enhance deodorization equipment is placed in the sludge enhancement tank. A dissolved oxygen concentration in the main body 3 is controlled within 0.4-0.8 mg/L through aeration under the use of the aeration pipe 13. Rising bubbles are generated by the aeration pipe 13 to drive wastewater to enter the first opening 7 and then flow out from the second opening 6, during which the microbial filler 11 and the carrier filler 12 adsorb and degrade odor-causing hydrogen sulfide, ammonia and organic acids in the wastewater. Deodorizing microorganisms, such as *Bacillus subtilis*, *Agrobacterium* and *Thiobacillus*, in the microbial filler 11 are continuously released and multiplied under the influence of the carrier filler, dissolved oxygen and nutrients in the wastewater. Subsequently, these deodorizing microorganisms enter the biochemical reaction tank along flowing wastewater and then enter excess activated sludge in a secondary settling tank. Partial excess settled activated sludge is returned to a starting point of the wastewater treatment system to rejoin the whole wastewater treatment process, in which the deodorizing microorganisms degrade and remove the odor-causing hydrogen sulfide, ammonia and organic acids, thereby avoiding the odor to be released from the wastewater treatment. Multiple filler layers are formed by alternate arrangement of the microbial filler 11 and the carrier filler 12, so as to improve the sustained release and rapid reproduction of the deodorizing microorganisms, thereby enhancing the biological deodorizing effect.

The embodiments disclosed herein are for illustration purpose and not limited thereto. It should be noted that any modification, replacement and combination made by those skilled in the art without departing from the spirit of the present application should fall within the scope as defined by the appended claims.

What is claimed is:

1. A bio-enhanced deodorization equipment, comprising:
   a main body;
   a filler container;
   a first cover;
   an aeration pipe;
   an air supply pipe; and
   a second cover;
   wherein a plurality of supports spaced apart are provided at a bottom of the main body; the first cover is arranged at the bottom of the main body and provided with a plurality of first openings spaced apart; the second cover is arranged on a top of the main body and provided with a plurality of second openings spaced apart; and the main body and the second cover are fixedly connected via a flange;
   the aeration pipe is arranged in the main body and above the first cover; and the air supply pipe is arranged out of the main body and communicated with the aeration pipe; and
   the filler container comprises a wall and at least three perforated separator plates vertically arranged in the filler container; a plurality of spaces are formed by the at least three perforated separator plates; and a microbial filler and a carrier filler are loaded in the spaces in an alternate manner.

2. The bio-enhanced deodorization equipment of claim 1, wherein the first cover is welded to the main body.

3. The bio-enhanced deodorization equipment of claim 1, wherein the aeration pipe consists of two aeration pipes in two loops.

* * * * *